(12) United States Patent
Darab

(10) Patent No.: US 7,939,041 B2
(45) Date of Patent: May 10, 2011

(54) COMPOSITE OXIDES OR HYDROXIDES COMPRISING ALUMINA AND ZIRCONIA FOR AUTOMOTIVE CATALYST APPLICATIONS AND METHOD OF MANUFACTURING

(75) Inventor: John G. Darab, Flemington, NJ (US)

(73) Assignee: Magnesium Elektron Limited, Salford (GB)

( * ) Notice: Subject to any disclaimer, the term of this patent is extended or adjusted under 35 U.S.C. 154(b) by 660 days.

(21) Appl. No.: 11/813,049

(22) PCT Filed: Dec. 30, 2005

(86) PCT No.: PCT/GB2005/005108
§ 371 (c)(1),
(2), (4) Date: Jun. 28, 2007

(87) PCT Pub. No.: WO2006/070201
PCT Pub. Date: Jul. 6, 2006

(65) Prior Publication Data
US 2008/0096760 A1    Apr. 24, 2008

(30) Foreign Application Priority Data
Dec. 30, 2004  (GB) .................................. 0428555.7

(51) Int. Cl.
*C01F 17/00*  (2006.01)
*C01F 7/02*  (2006.01)
*C01G 25/02*  (2006.01)
(52) U.S. Cl. ................ 423/263; 423/593.1; 423/594.12; 423/600; 423/608; 502/300; 502/302; 502/304; 502/308; 502/355
(58) Field of Classification Search .............. 423/71, 423/115, 263, 593.1, 594.12, 600, 608; 502/300, 502/302, 304, 308, 348, 351, 355
See application file for complete search history.

(56) References Cited

U.S. PATENT DOCUMENTS
4,956,328 A    9/1990  Frohning et al.
(Continued)

FOREIGN PATENT DOCUMENTS
EP    0 122 644    10/1984
(Continued)

OTHER PUBLICATIONS

Patent Abstracts of Japan, vol. 1999, No. 10, Aug. 31, 1999 & JP 11 130436, Mitsui Mining & Smelting Co., Ltd., May 18, 1999, Abstract.

(Continued)

*Primary Examiner* — Timothy C Vanoy
*Assistant Examiner* — Diana J Liao
(74) *Attorney, Agent, or Firm* — Pearne & Gordon LLP

(57) ABSTRACT

An improved method for the formation of composite hydroxides or oxides comprising, on an oxide basis, $Al_2O_3$ and $ZrO_2$, and optionally $CeO_2$, $La_2O_3$, $Nd_2O_3$, $Pr_6O_{11}$, $Sm_2O_3$, $Y_2O_3$, and other rare earth oxides, comprising the steps of preparing an aqueous metal salt solution and forming a hydroxide precipitate slurry by combining the aqueous metal salt solution with an aqueous solution of a caustic alkali at a pH greater than 8.5 to precipitate out all the metal species. The variation in pH during the precipitation reaction is ±1. The invention also relates to composites formed by this method comprising 20-70 wt % $Al_2O_3$, 10-77 wt % $ZrO_2$, 0-34 wt % $CeO_2$ and 0-22 wt % REOs other than $CeO_2$, and to composites per se comprising, on an oxide basis, 42-70 wt % $Al_2O_3$, 10-48 wt % $ZrO_2$, 2-34 wt % $CeO_2$ and 0-9 wt % REOs other than $CeO_2$ and having the following properties after heating to 850° C. over four hours and holding at 850° C. for four hours then allowing to cool to ambient temperature: —a surface area after aging at 950° C. for 2 hours equal to or greater than 60 $m^2/g$, and —a surface area after aging at 1100° C. for 2 hours equal to or greater than 30 $m^2/g$.

7 Claims, 1 Drawing Sheet

U.S. PATENT DOCUMENTS

Figure 1:
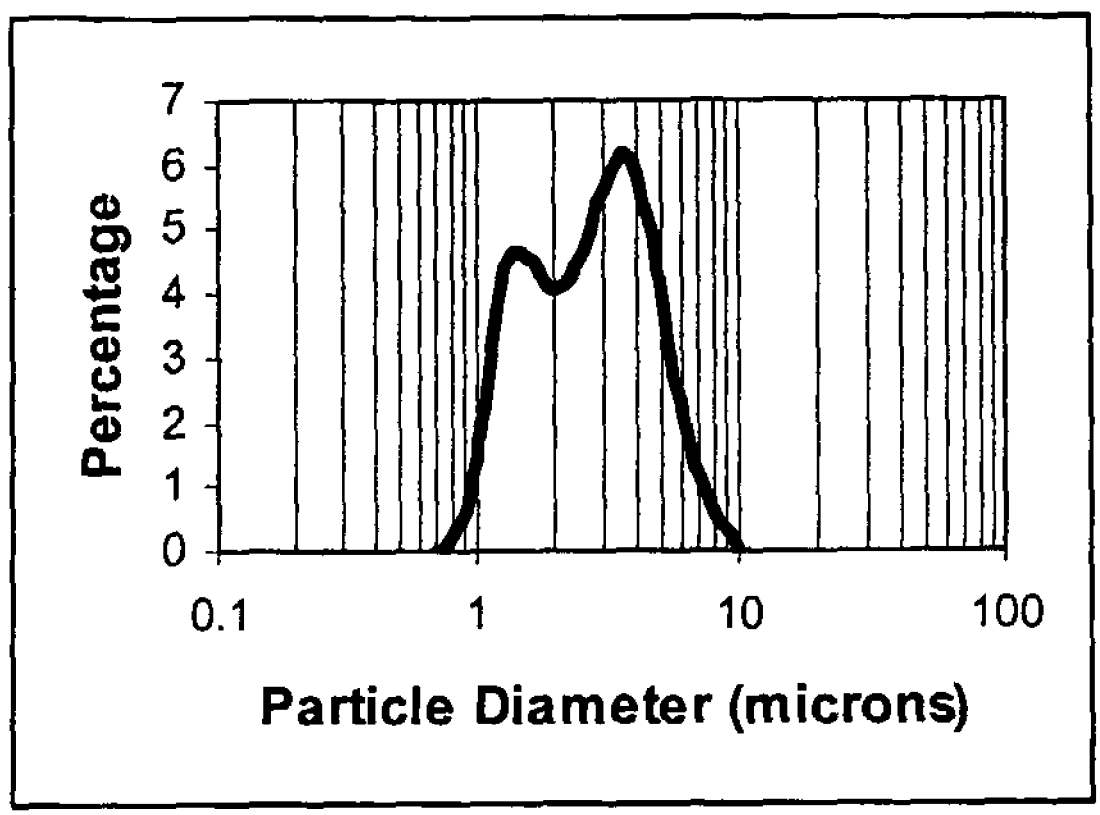

| | | | |
|---|---|---|---|
| 5,207,814 | A | 5/1993 | Cogliati et al. |
| 5,262,373 | A | 11/1993 | Durand et al. |
| 5,580,536 | A | 12/1996 | Yao et al. |
| 5,883,037 | A | 3/1999 | Chopin et al. |
| 6,150,288 | A | 11/2000 | Suzuki et al. |
| 6,214,306 | B1 * | 4/2001 | Aubert et al. ............ 423/213.2 |
| 6,306,794 | B1 | 10/2001 | Suzuki et al. |
| 7,767,617 | B2 * | 8/2010 | Larcher et al. ............ 502/304 |

FOREIGN PATENT DOCUMENTS

| | | |
|---|---|---|
| EP | 1 172 139 | 1/2002 |
| JP | 4004043 | 1/1992 |
| RU | 2100067 | 12/1997 |
| WO | 87/07885 | 12/1987 |

OTHER PUBLICATIONS

Chen, Yu-Wen et al., "Preparation of alumina-zirconia materials by the sol-gel method from metal alkoxides," Journal of Non-Crystalline Solids, vol. 185, 1995, pp. 49-55.

Podzorova, L.I. et al., "Effect of synthesis conditions on the phase composition of $ZrO_2$-$CeO_2$-$Al_2O_3$ sol-gel powders," Inorganic Materials, vol. 37, No. 1, 2001, pp. 51-57.

Patent Abstracts of Japan, vol. 2000, No. 25, Apr. 12, 2001 & JP 2001-232199, Toyota Motor Corp., Aug. 28, 2001, abstract.

International Search Report (PCT/GB2005/005108) dated Sep. 18, 2006.

Search Report issued in GB428555.7 dated Apr. 6, 2005.

* cited by examiner

COMPOSITE OXIDES OR HYDROXIDES COMPRISING ALUMINA AND ZIRCONIA FOR AUTOMOTIVE CATALYST APPLICATIONS AND METHOD OF MANUFACTURING

This application claims the benefit of International Application Number PCT/GB2005/005108, which was published in English on Jul. 6, 2006.

BACKGROUND OF INVENTION

Traditional three way catalytic (TWC) converters used in automotive exhaust abatement schemes are typically made by multiple wash-coating cordierite honeycomb monoliths with combinations of aluminum oxide, oxygen storage component (OSC) oxides such as cerium-doped zirconium oxide, and platinum group metals (PGMs).

Of considerable recent interest is a new type of composite material with specific compositions consisting of about 40-70 wt % $Al_2O_3$ with the balance typically being made up of $CeO_2$, $ZrO_2$, and perhaps some stabilizers (i.e., the OS component). Furthermore, for these types of composite materials, it is desirable to have the OS and $Al_2O_3$ components mixed as homogeneous as possible, and it is because of this that the manner in which the first steps in making such materials, steps involving the co-precipitation of a composite hydroxide and its subsequent treatment, become critical to defining the final properties of the material.

In a typical co-precipitation approach to making a composite material ultimately containing $CeO_2$, $ZrO_2$, and $Al_2O_3$, for example, one might first take a fixed amount of an acidic aqueous metal salt solution containing cerium nitrate, zirconyl nitrate and aluminum nitrate and slowly add an alkaline aqueous solution of, for example, sodium hydroxide thereby increasing the metal salt solution pH causing the precipitation of a mixture of cerium hydroxide, zirconium hydroxide and aluminum hydroxide. Since these hydroxides form at different pH values during this acid-into-base co-precipitation, the resulting co-precipitate in the end will not typically be as homogeneous as the same composition made by a base-into-acid co-precipitation, where the pH is always sufficiently high to cause all the hydroxides to simultaneously precipitate.

In a base-into-acid co-precipitation of composites containing hydroxides of zirconium, aluminum and rare earths, the acidic aqueous metal salt solution is slowly added to a fixed amount of an alkaline aqueous solution of, for example, sodium hydroxide. The pH should be kept greater than about 9.0 to assure that all the species precipitate out. However, in a base-into-acid co-precipitation of AlOOH-containing materials, such as those discussed here, the pH also needs to be less than about 10.5. At pH values greater than 10.5, one needs to be concerned about the re-dissolution of the formed AlOOH. In order to maintain such a range in pH (9.0<pH<10.5) using a fixed amount of an alkaline aqueous solution, the concentration of composite hydroxide in the ultimate slurry that forms is usually too low and thus provides yields of products that are too low to be of practical use on an industrial scale.

Alternatively, a fixed amount of an acidic aqueous metal salt solution can be rapidly combined with a calculated amount of an alkaline aqueous solution. Although these solutions are mixed rapidly and in the end the final pH will be sufficiently basic to have caused all the metal hydroxides to precipitate out, during the mixing there may still be temporary undesirable fluctuations in pH, which has a detrimental effect on the properties of the resulting material.

These approaches to making such composite materials are by themselves not novel. In U.S. Pat. Nos. 6,150,288 and 6,306,794 by Suzuki, et al. a method of making $CeO_2$—$ZrO_2$—$Al_2O_3$ and $CeO_2$-$MO_x$—$ZrO_2$—$Al_2O_3$ composite materials by such approaches is described.

The invention as detailed here is different from what is presented by Suzuki, et al. and involves forming a composite hydroxide precipitate slurry using the following steps:

adding an acidic aqueous solution containing appropriate metal salts in a controlled manner to an alkaline aqueous solution in a reaction vessel with agitation at a specific precipitation pH that is sufficiently basic to cause the formation of the hydroxide precipitate maintaining a constant precipitation pH during the addition of the acid aqueous metal salt solution by adding a second stream of alkaline aqueous solution in a controlled manner to the reaction vessel until all the acidic aqueous metal salt solution has been added and the precipitation reaction is complete, resulting in a hydroxide precipitate slurry.

It has been surprisingly found that by using the method described above, a significantly homogeneous composite precipitate can be formed. By maintaining better control over the precipitation pH over the entire course of precipitation than the approach typical of that used by Suzuki, et al, this method allows the production of improved composite materials in commercially viable yields.

A further improvement of this current invention over the approach used by Suzuki, et al. (above) and Yao, et al. (below) for making such composite materials is to thermally treat the resulting aqueous slurry at a pH of between 8.0 and 10.5, at a treatment temperature of greater than or equal to 60° C., and at a treatment pressure of greater than or equal to 0.0 barg for a treatment time of greater than or equal to one hour.

The application of a thermal treatment to a precipitated slurry for such composite hydroxides by itself is not novel. In U.S. Pat. No. 5,580,536 by Yao, et al. a method of making 4.99-98.89 wt % $CeO_2$, 1-95 wt % $ZrO_2$, 0.01-20 wt % $HfO_2$, and 0.1-10 wt % of an additional metal oxide, including $Al_2O_3$ is provided and includes a thermal treatment at temperatures of 100-135° C. for 0.5-1.0 hours. However, in the patent by Yao, et al. no mention is made of a specific pH for the hydrothermal treatment. Thermal treatment at the elevated pH values described in the present invention compared to treatments done under closer to neutral pH conditions produce materials after washing, drying, and calcining that exhibit significantly greater aged surface areas, for example. Furthermore, the compositions presented in the current invention are significantly different from the range specified by Yao, et al.

It can often be the case that the sulphate anion and chloride anion levels in composite materials can be too high for automotive catalyst applications. This can even be the case where these anions are not deliberately added during processing. The present invention seeks to resolve this problem by adjusting the pH of the hydroxide precipitate slurry so that it is sufficiently basic to remove these and other anionic contaminants.

DETAILED DESCRIPTION OF THE INVENTION

The present invention seeks to provide an improved method for the formation of composite hydroxides or oxides comprising, on an oxide basis, alumina ($Al_2O_3$) and zirconia ($ZrO_2$), and optionally including at least one member selected from ceria ($CeO_2$), lanthana ($La_2C_3$), neodymia ($Nd_2O_3$), praseodymia ($Pr_6O_{11}$), samaria ($Sm_2O_3$), yttria ($Y_2O_3$), and other rare earth oxides (REO).

The method comprises the following steps:
preparing an aqueous metal salt solution consisting of the water-soluble salts of metals corresponding to those of the aforementioned composite oxide, and forming of a hydroxide precipitate slurry by combining the aqueous metal salt solution with an aqueous solution of a caustic alkali in a reaction vessel with agitation at a pH greater than 8.5 to precipitate out all the metal species and wherein the variation in pH during the precipitation reaction is +/−1.

This means that, if the pH is maintained at 8.5 during the precipitation reaction, a pH range of 7.5 to 9.5 would be acceptable. Preferably the variation in the pH during reaction should be +/−0.5.

The method may comprise one or more of the following additional steps:
optionally washing the hydroxide precipitate slurry with de-ionized water, treating the optionally washed hydroxide precipitate slurry at a treatment pH of between 8.0 and 10.5, at a treatment temperature of greater than or equal to 60° C., and at a treatment pressure of greater than or equal to 0.00 barg for a treatment time of greater than or equal to one hour, optionally converting the treated and optionally washed hydroxide precipitate to an oxide product through a specific thermal treatment cycle or cycles, and optionally post-treating the product to achieve a specific particle size distribution.

The aqueous metal salt solution used in the method of the present invention may comprise one or more reagents selected from the following: aluminum nitrate nonahydrate crystals, aqueous aluminum nitrate solution, aluminum sulfate crystals, aluminum chloride crystals, aqueous zirconyl chloride solution, aqueous zirconyl nitrate solution, aqueous zirconium sulfate solution, aqueous cerium(III) nitrate solution, aqueous praseodymium(III) nitrate solution, aqueous lanthanum nitrate solution and aqueous samarium nitrate solution.

The caustic alkali is generally selected from the following: sodium hydroxide, potassium hydroxide, cesium hydroxide and ammonium hydroxide.

According the process of the present invention the said step of forming the hydroxide precipitate slurry preferably comprises the following steps:
adding the said aqueous metal salt solution in a controlled manner to an aqueous solution of said caustic alkali in a reaction vessel with agitation at a specific precipitation pH that is sufficiently basic to cause the formation of the hydroxide precipitate, and maintaining a substantially constant precipitation pH during the addition of the said aqueous metal salt solution by adding a second stream of said caustic alkali in a controlled manner to the reaction vessel until all the aqueous metal salt solution has been added and the precipitation reaction is complete, resulting in a hydroxide precipitate slurry.

The precipitation pH used in the formation of the hydroxide precipitate slurry is preferably greater than 8.5 but less than or equal to 10.5, and most preferably 10.0.

According the process of the present invention the said step of treating the optionally washed hydroxide precipitate slurry preferably comprises the following steps:
adding an aqueous solution of hydrogen peroxide to said hydroxide precipitate slurry, performing an optional first pre-treatment wash on the hydroxide precipitate to remove anionic by-products and contaminants, performing an optional second pre-treatment wash to further remove cationic by-products and contaminants from the hydroxide precipitate, adjusting the pH of the washed hydroxide precipitate slurry to a treatment pH of between 8.0 and 10.5, preferably between 9.5 and 10.5, then treating the slurry at a treatment temperature of greater than or equal to 60° C., and at a treatment pressure of greater than or equal to 0.0 barg for a treatment time of greater than or equal to one hour, performing an optional post-treatment wash to remove anionic by-products and contaminants from the hydroxide precipitate, and performing a final wash to remove any remaining cationic by-products and contaminants from the hydroxide precipitate.

Post-precipitation treatment should be optimised for particular compositions. Preferred combinations of approximate treatment temperature, pressure and time are:
A. the said treatment temperature is 90° C., the said treatment pressure is 0.0 barg, and the said treatment time is greater than or equal to 6 hours.

B. the said treatment temperature is 120° C., the said treatment pressure is 1.0 barg, and the said treatment time is 6 hours.

C. the said treatment temperature is 143° C., the said treatment pressure is 3.0 barg, and the said treatment time is 5 hours.

The first pre-treatment (optional) wash or the post-treatment (optional) wash of the step of treating the optionally washed hydroxide precipitate slurry described above preferably comprises the following steps:
adjusting the pH of the hydroxide precipitate slurry with caustic alkali to a specific first pre-treatment or post-treatment wash pH that is sufficiently basic so as to facilitate the removal of sulfate anions, chloride anions and other anionic contaminants from the hydroxide precipitate, adjusting the first pre-treatment or post-treatment wash temperature of the pH-adjusted hydroxide precipitate slurry to greater than or equal to ambient temperature but less than its boiling point, separating the by-product- and contaminant-laden liquid from the hydroxide precipitate by filtration, centrifuging or by other acceptable methods, preparing a rinsing solution that consists of de-ionized water or de-ionized water containing sufficient caustic to bring its pH to that of the aforementioned first pre-treatment or post-treatment wash pH, adjusting the temperature of the rinsing solution to greater than or equal to ambient temperature but less than or equal to its boiling point, rinsing the hydroxide precipitate with the aforementioned rinsing solution, and optionally further washing the hydroxide precipitate with pure de-ionized water.

The first pre-treatment or post-treatment wash pH is preferably greater than 8.5 but less than or equal to 10.5, more preferably greater than 9.0 but less than or equal to 10.5 and most preferably 10.5.

The pH-adjusted hydroxide precipitate slurry is preferably heated to 60° C.

The rinsing solution is preferably heated to 60° C.

The pure de-ionized water is preferably heated to a temperature greater than or equal to ambient temperature but less than or equal to its boiling point, most preferably to 60° C.

Both/either of the second pre-treatment (optional) wash and/or the final wash of the step of treating the optionally washed hydroxide precipitate slurry described above preferably comprises the following steps:

adjusting the pH of the treated hydroxide precipitate slurry to a specific second pre-treatment or final wash pH that is sufficiently low in basicity so as to facilitate the removal of sodium cations, alkali metal cations in general, and other cationic contaminants from the hydroxide precipitate, adjusting the second pre-treatment or final wash temperature of the pH-adjusted treated hydroxide precipitate slurry to greater than or equal to ambient temperature but less than its boiling point, separating the byproduct- and contaminant-laden liquid from the hydroxide precipitate by filtration, centrifuging, or by other acceptable methods, and rinsing the hydroxide precipitate with de-ionized water that has had its temperature adjusted to greater than or equal to ambient temperature but less than its boiling point.

In the above process it is preferred that the said second pre-treatment or final wash pH is greater than 5.0 but less than or equal to 8.0, more preferably greater than 6.0 but less than or equal to 8.0, even more preferably greater than 6.5 but less than or equal to 8.0 and most preferably 8.0.

The pH-adjusted hydroxide precipitate slurry in the above process is preferably heated to 60° C.

The de-ionized water in the above process is preferably heated to 60° C.

According the process of the present invention the said optional conversion of the treated and optionally washed hydroxide precipitate to an oxide product preferably comprises the following steps:

optionally drying the composite hydroxide material at temperatures of up to 500° C. to remove water using a variety of commercially available methods and equipment such as but not limited to spray drying, drying in a Nauta or Ross drier, or drying in a Thermojet (manufactured by Fluid Energy), and calcining the composite hydroxide material or the optionally dried composite hydroxide material by heating it to temperatures greater than or equal to 700° C. to convert the material to a composite oxide.

Preferred calcination temperatures are 700° C. and 850° C.

According the process of the present invention the said optional post-treatment of the product to achieve a particle size distribution such that most of the particles are less than 10 microns in diameter is performed using jet milling, for example via a Rotojet or a Microjet (both manufactured by Fluid Energy).

The preferred composition range for the final composite formed by the method specified herein is, on an oxide basis, 20-70 wt % $Al_2O_3$, 10-77 wt % $ZrO_2$, 0-34 wt % $CeO_2$ and 0-22 wt % REOs other than $CeO_2$.

Further preferred composition ranges for the composites specified above are:
(i) 29-70 wt % $Al_2O_3$ and 30-71 wt % $ZrO_2$,
(ii) 59-66 wt % $Al_2O_3$ and 34-41 wt % $ZrO_2$, or
(iii) 16-22 wt % $La_2O_3$, 20-27 wt % $Al_2O_3$ and 54-61 wt % $ZrO_2$.

Preferred composition ranges and composite properties that this present invention seeks to provide are:

A. A composite comprising, on an oxide basis, 42-70 wt % $Al_2O_3$, 10-48 wt % $ZrO_2$, 2-34 wt % $CeO_2$ and 0-9 wt % REOs other than $CeO_2$ and having the following properties after heating to 850° C. over four hours and holding at 850° C. for four hours then allowing to cool to ambient temperature:
  a surface area after aging at 950° C. for 2 hours equal to or greater than 60 $m^2/g$, and
  a surface area after aging at 1100° C. for 2 hours equal to or greater than 30 $m^2/g$.

B. A composite comprising, on an oxide basis, 42-53 wt % $Al_2O_3$, 20-46 wt % $ZrO_2$, 4-34 wt % $CeO_2$ and 0-7 wt % REOs other than $CeO_2$ and $La_2O_3$ and having the following properties after heating to 850° C. over four hours and holding at 850° C. for four hours then allowing to cool to ambient temperature:
  a surface area after aging at 950° C. for 2 hours equal to or greater than 70 $m^2/g$, and
  a surface area after aging at 1100° C. for 2 hours equal to or greater than 35 $m^2/g$.

C. A composite comprising, on an oxide basis, 42-53 wt % $Al_2O_3$, 23-28 wt % $ZrO_2$, 24-29 wt % $CeO_2$ and 1-6 wt % $Pr_6O_{11}$ and having the following properties after heating to 850° C. over four hours and holding at 850° C. for four hours then allowing to cool to ambient temperature:
  a surface area after aging at 950° C. for 2 hours equal to or greater than 70 $m^2/g$,
  a surface area after aging at 1000° C. for 4 hours equal to or greater than 56 $m^2/g$, and
  a surface area after aging at 1100° C. for 2 hours equal to or greater than 41 $m^2/g$.

D. A composite comprising, on an oxide basis, 45-53 wt % $Al_2O_3$, 20-27 wt % $ZrO_2$, and 26-31 wt % $CeO_2$ and having the following properties after heating to 850° C. over four hours and holding at 850° C. for four hours then allowing to cool to ambient temperature:
  a surface area after aging at 950° C. for 2 hours equal to or greater than 70 $m^2/g$,
  a surface area after aging at 1000° C. for 4 hours equal to or greater than 57 $m^2/g$, and
  a surface area after aging at 1100° C. for 2 hours equal to or greater than 43 $m^2/g$.

E. A composite comprising, on an oxide basis, 44-50 wt % $Al_2O_3$, 35-43 wt % $ZrO_2$, and 12-16 wt % $CeO_2$ and having the following properties after heating to 850° C. over four hours and holding at 850° C. for four hours then allowing to cool to ambient temperature:
  a surface area after aging at 950° C. for 2 hours equal to or greater than 75 $m^2/g$, and
  a surface area after aging at 1100° C. for 2 hours equal to or greater than 41 $m^2/g$.

F. A composite comprising, on an oxide basis, 60-70 wt % $Al_2O_3$, 10-15 wt % $ZrO_2$, 10-15 wt % $CeO_2$ and 1-7 wt % REOs other than $CeO_2$ and having the following properties after heating to 850° C. over four hours and holding at 850° C. for four hours then allowing to cool to ambient temperature:
  a surface area after aging at 950° C. for 2 hours equal to or greater than 75 $m^2/g$,
  a surface area after aging at 1000° C. for 4 hours equal to or greater than 70 $m^2/g$,
  a surface area after aging at 1050° C. for 2 hours equal to or greater than 65 $m^2/g$, and
  a surface area after aging at 1100° C. for 2 hours equal to or greater than 55 $m^2/g$.

G. A composite comprising, on an oxide basis, 23-30 wt % $Al_2O_3$, and 70-77 wt % $ZrO_2$ and having the following properties after heating to 700° C. over four hours and holding at 700° C. for four hours then allowing to cool to ambient temperature:
  a surface area after aging at 950° C. for 2 hours equal to or greater than 59 m²/g, and
  a surface area after aging at 1100° C. for 2 hours equal to or greater than 18 m²/g.

DRAWINGS

FIG. 1 shows the particle size distribution of the PP212C material referred to in Examples 6 and 7 after jet milling.

DETAILS OF PREFERRED EMBODIMENTS

Example 1

Preparation of the Wet Cake

The following is an example demonstrating the method of preparing a hydroxide precipitate with an ultimate oxide composition of 4.3 wt % $CeO_2$, 45.4 wt % $ZrO_2$, and 50.3 wt % $Al_2O_3$. An aqueous solution of metal salts was prepared by first dissolving 26.7 lbs (12.1 kg) of aluminum nitrate nonahydrate crystals into 68.3 lbs (31.0 kg) of de-ionized water in a 100 gallon (455 liter) intensive mixing tank equipped with an agitator rotating at high speed, mixing for 30 minutes, adding to this mixture 1.4 lbs (0.64 kg) of cerium(III) nitrate stock aqueous solution (26.7 wt % on a $CeO_2$ basis) and 16.3 lbs (7.4 kg) of zirconyl nitrate stock aqueous solution (20.1 wt % on a $ZrO_2$ basis), mixing for another 15 minutes, then reserving the solution in a separate vessel. The intensive mixing tank was then rinsed out with de-ionized water.

A dilute caustic solution was prepared by adding 68.3 lbs (31.0 kg) of de-ionized water to the intensive mixing tank and adjusting the pH to 10.0 using 25% caustic (sodium hydroxide solution). With the intensive mixing tank agitator rotating at high speed, to this dilute caustic solution the metal salt solution previously prepared was then transferred from its vessel in to the intensive mixing tank using a peristaltic pump. A separate stream of 25% caustic was simultaneously added from a separate vessel above the intensive mixing tank by opening a valve and allowing the caustic to flow into the intensive mixing tank due to gravity. The goal of this procedure was to maintain a constant precipitation pH of 10.0. By adjusting the flow rates of both the metal salt solution and the 25% caustic, such a constant precipitation pH was achieved. If the precipitation pH decreased to below 9.5, the addition of metal salt solution was temporarily halted until the pH increased to above 9.5. If the precipitation pH increased to above 10.5, the addition of caustic was temporarily halted until the pH decreased to above 10.5. In the first 1-2 minutes of the precipitation, the precipitation pH could vary by as much as 1 pH unit, after that the variation in pH dropped to 0.5 pH units. After about 10-15 minutes, the variation in pH dropped to 0.1 pH units.

After all the metal salt solution had been transferred, the addition of caustic was stopped and the final pH of the resulting slurry adjusted to 10.0. Subsequently, 0.5 lbs of 35% hydrogen peroxide was added to the slurry, the pH was re-adjusted to 10.0 using caustic, and the slurry was allowed to mix for one hour.

The pH of the slurry was adjusted to 8.0 using 30% nitric acid and mixed for 30 minutes. Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water was used to wash the wet cake until the ionic conductivity of the waste water exiting the centrifuge was <0.5 mS.

Example 2

A 500 gram portion of the washed wet cake prepared in EXAMPLE 1 was dried at 100° C./18 hrs, calcined at 700°/4 hrs, then aged at 1100° C./2 hrs. The aged surface area was determined to be 29.7 m²/g.

Example 3

A 500 gram portion of the washed wet cake prepared in EXAMPLE 1 was re-slurried with 3 L of de-ionized water in a 5 L glass beaker using a laboratory-scale high-speed agitator and the pH adjusted 8.0 using caustic. The slurry was then put into a laboratory-scale pressure vessel fitted with a stirrer and hydrothermally treated at 120° C. for 6 hrs. After appropriate post-hydrothermal treatments (filtering, washing, etc. as needed), the portion was then dried at 100° C./18 hrs, calcined at 700° C./4 hrs, then aged at 1100° C./2 hrs. The aged surface area was determined to be 38.1 m²/g.

Example 4

A 500 gram portion of the washed wet cake prepared in EXAMPLE 1 was re-slurried with 3 L of de-ionized water in a 5 L glass beaker using a laboratory-scale high-speed agitator and the pH adjusted 10.0 using caustic. The slurry was then put into a laboratory-scale pressure vessel fitted with a stirrer and hydrothermally treated at 120° C. for 6 hrs. After appropriate post-hydrothermal treatments (filtering, washing, etc. as needed), the portion was then dried at 100° C./18 hrs, calcined at 700° C./4 hrs, then aged at 1100° C./2 hrs. The aged surface area was determined to be 46.0 m²/g. Note that the 1110° C./2 hr aged surface area of this material is substantially greater than that of the materials prepared in EXAMPLES 2 and 3, indicating that thermal treatment of an aqueous slurry of the precipitate is important as is the pH of slurry during thermal treatment.

Example 5

The following is an example demonstrating the method of preparing an oxide powder from a hydroxide precipitate with an ultimate target oxide composition of 4.3 wt % $CeO_2$, 45.4 wt % $ZrO_2$, and 50.3 wt % $Al_2O_3$. The remaining washed wet cake prepared in EXAMPLE 1 was re-slurried in a 100 gallon (455 liter) intensive mixing tank equipped with an agitator rotating at high speed with enough de-ionized water to yield approximately 24 gallons (109 liters) of slurry and the pH adjusted 10.0 using caustic (30% sodium hydroxide solution). The slurry was then pumped into a pilot-scale pressure vessel fitted with a stirrer and hydrothermally treated at 120° C. for 6 hrs. After the slurry temperature cooled sufficiently, it was discharged from the pressure vessel into the intensive mixing tank where the pH was adjusted to 8.0 using 30% nitric acid and the slurry allowed to mix for 30 minutes.

Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water heated to 60° C. was used to wash the wet cake until the ionic conductivity of the waste water exiting the centrifuge was <0.5 mS.

The product was finished by calcining the cake (no drying at all) at 850° C. for 4 hours in the pilot plant kiln. After calcination, the chunks of material were pulverized into a coarse powder. A sample of this powder was then aged at 1100° C./2 hrs. The characterization results obtained from this material (PP311B) are summarized in Table 1, below.

TABLE 1

Characteristics of composite materials obtained from EXAMPLE 5 (PP211B) and EXAMPLE 6 (PP212C)

| Material | PP211B | PP212C |
|---|---|---|
| [$CeO_2$] (wt %) | 4.3 | 14.2 |
| [$ZrO_2$] (wt %) | 45.4 | 34.8 |
| [$Al_2O_3$] (wt %) | 50.3 | 51.0 |
| Final [$SO_3$] (wt %) | 0.22 | 0.23 |
| Leachable [Na] (ppm) | 43 | 57 |
| Leachable [Cl] (ppm) | 305 | 360 |
| As-prepared SA ($m^2/g$) | 126 | 120 |
| 950° C./2 hrs ASA ($m^2/g$) | 87 | 77 |
| 1100° C./2 hrs ASA ($m^2/g$) | 41 | 43 |
| 1200° C./2 hrs ASA ($m^2/g$) | 9 | 16 |

Example 6

The following is an example demonstrating the method of preparing an oxide powder with an ultimate oxide composition of 14.2 wt % $CeO_2$, 34.8 wt % $ZrO_2$, and 51.0 wt % $Al_2O_3$. An aqueous solution of metal salts was prepared by first dissolving 26.8 lbs (12.2 kg) of aluminum nitrate nonahydrate crystals into 72.1 lbs (32.7 kg) of de-ionized water in a 100 gallon (455 liter) intensive mixing tank equipped with an agitator rotating at high speed, mixing for 30 minutes, adding to this mixture 3.9 lbs (1.8 kg) of cerium(III) nitrate stock aqueous solution (26.7 wt % on a $CeO_2$ basis) and 15.0 lbs (6.8 kg) of zirconyl nitrate stock aqueous solution (20.1 wt % on a $ZrO_2$ basis), mixing for another 15 minutes, then reserving the solution in a separate vessel. The intensive mixing tank was then rinsed out with de-ionized water.

A dilute caustic solution was prepared by adding 72.1 lbs (32.7 kg) of de-ionized water to the intensive mixing tank and adjusting the pH to 10.0 using 25% caustic (sodium hydroxide solution). With the intensive mixing tank agitator rotating at high speed, to this dilute caustic solution the metal salt solution previously prepared was then transferred from its vessel in to the intensive mixing tank using a peristaltic pump. A separate stream of 25% caustic was simultaneously added from yet a separate vessel above the intensive mixing tank by opening a valve and allowing the caustic to flow into the intensive mixing tank due to gravity. Similar to EXAMPLE 1, using this procedure allowed for a constant precipitation pH of 10.0.

After all the metal salt solution had been transferred, the addition of caustic was stopped and the final pH of the resulting slurry adjusted to 10.0. Subsequently, 1.2 lbs of 35% hydrogen peroxide was added to the slurry, the pH was re-adjusted to 10.0 using caustic, and the slurry was allowed to mix for one hour.

The pH of the slurry was adjusted to 8.0 using 30% nitric acid and mixed for 30 minutes. Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water that had been heated to 60° C. was used to wash the wet cake until the ionic conductivity of the waste water exiting the centrifuge was <0.5 mS.

The washed wet cake was re-slurried in the intensive mixing tank with an agitator rotating at high speed with enough de-ionized water to yield approximately 24 gallons (109 liters) of slurry and the pH adjusted 10.0 using caustic (30% sodium hydroxide solution). The slurry was then pumped into a pilot-scale pressure vessel fitted with a stirrer and hydrothermally treated at 120° C. for 6 hrs. After the slurry temperature cooled sufficiently, it was discharged from the pressure vessel into the intensive mixing tank where the pH was adjusted to 8.0 using 30% nitric acid and the slurry allowed to mix for 30 minutes.

Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water that had been heated to 60° C. was used to wash the wet cake until the ionic conductivity of the waste water exiting the centrifuge was <0.5 mS.

The product was finished by calcining the cake (no drying at all) at 850° C. for 4 hours in the pilot plant kiln. After calcination, the chunks of material were pulverized into a coarse powder. A sample of this powder was then aged at 1100° C./2 hrs. The characterization results obtained from this material (PP212C) are summarized in Table 1.

Example 7

The calcined, but un-aged, material from EXAMPLE 6 (PP212C) was jet milled at Fluid Energy in Telford, Pa. to yield a product with an acceptable particle size distribution (PSD) for wash-coating applications at automotive catalyst manufacturers. The PSD of this material is indicated in FIG. 1.

Example 8

The following is an example demonstrating the method of preparing an oxide powder with an ultimate oxide composition of 5.5 wt % $CeO_2$, 46.8 wt % $ZrO_2$, and 47.7 wt % $Al_2O_3$ with sulfate concentration less than 0.05 percent by weight and leachable chloride levels less than 200 ppm on a dry oxide basis. An aqueous solution of metal salts was prepared by first dissolving 36.4 lbs (16.5 kg) of aluminum nitrate nonahydrate crystals into 93.1 lbs (42.2 kg) of de-ionized water in a 100 gallon (455 liter) intensive mixing tank equipped with an agitator rotating at high speed, mixing for 30 minutes, adding to this mixture 1.9 lbs (0.86 kg) of cerium(III) nitrate stock aqueous solution (26.7 wt % on a $CeO_2$ basis) and 22.2 lbs (10.1 kg) of zirconyl nitrate (20.1 wt % on a $CeO_2$ basis) stock aqueous solution, mixing for another 15 minutes, then reserving the solution in a separate vessel. The intensive mixing tank was then rinsed out with de-ionized water.

A dilute caustic solution was prepared by adding 93.1 lbs (42.2 kg) of de-ionized water to the intensive mixing tank and adjusting the pH to 10.0 using 25% caustic (sodium hydroxide solution). With the intensive mixing tank agitator rotating at high speed, to this dilute caustic solution the metal salt solution previously prepared was then transferred from its vessel in to the intensive mixing tank using a peristaltic pump. A separate stream of 25% caustic was simultaneously added from yet a separate vessel above the intensive mixing tank by opening a valve and allowing the caustic to flow into the intensive mixing tank due to gravity. Similar to EXAMPLE 1, using this procedure allowed for a constant precipitation pH of 10.0.

After all the metal salt solution had been transferred, the addition of caustic was stopped and the final pH of the resulting slurry adjusted to 10.5. Subsequently, 0.6 lbs of 35% hydrogen peroxide was added to the slurry, the pH was re-adjusted to 10.5 using caustic, and the slurry was allowed to mix for 30 minutes.

Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, 100 gallons (455 liters) of de-ionized water that has had its pH adjusted to 10.0 using caustic then heated to 60° C. was used to wash the wet cake. Subsequently, de-ionized water that had been heated to 140° F. (60° C.) was used to wash the wet cake until the ionic conductivity of the waste water exiting the centrifuge was <0.5 mS.

The resulting wet cake was then analytically checked to make sure the sulfate concentration was less than 0.05 percent by mass on a dried oxide basis and the chloride content was less than 200 ppm on a dried oxide basis before proceeding further.

The first washed wet cake was re-slurried in the intensive mixing tank with an agitator rotating at high speed and the pH adjusted to 8.0 using 30% nitric acid and mixed for 30 minutes. Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water that had been heated to 60° C. was used to wash the wet cake until the ionic conductivity of the waste water exiting the centrifuge was <0.5 mS.

The resulting wet cake was then analytically checked to make sure the sodium concentration was less than 200 ppm by mass on a dried oxide basis before proceeding further.

The second washed wet cake was re-slurried in the intensive mixing tank with an agitator rotating at high speed with enough de-ionized water to yield approximately 24 gallons (109 liters) of slurry and the pH adjusted 10.0 using caustic (30% sodium hydroxide solution). The slurry was then pumped into a pilot-scale pressure vessel fitted with a stirrer and hydrothermally treated at 120° C. for 6 hrs. After the slurry temperature cooled sufficiently, it was discharged from the pressure vessel into the intensive mixing tank where the pH was adjusted to 8.0 using 30% nitric acid and the slurry allowed to mix for 30 minutes.

Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water heated to 60° C. was used to wash the wet cake until the ionic conductivity of the waste water exiting the centrifuge was <0.5 mS.

The resulting wet cake was then analytically checked to make sure the sodium concentration was less than 200 ppm by mass on a dried oxide basis before proceeding further.

The product was finished by calcining the cake (no drying at all) at 850° C. for 4 hours in the pilot plant kiln. After calcination, the chunks of material were pulverized into a coarse powder. Samples of this powder were then aged at 950° C./2 hrs, 1100° C./2 hrs, or 1200° C./2 hrs. The characterization results obtained from this material (Example 6) are summarized in Table 2, below, and are compared with those obtained from Example 3. Note that the $SO_4^{2-}$ and $Cl^-$ levels in Example 6 are significantly less that those in Example 3.

TABLE 2

Characteristics of composite materials obtained from EXAMPLE 8 (PP217I) and EXAMPLE 5 (PP211B, for comparison).

| Material | PP211B | PP217I |
|---|---|---|
| [$CeO_2$] (wt %) | 4.3 | 5.5 |
| [$ZrO_2$] (wt %) | 45.4 | 46.8 |
| [$Al_2O_3$] (wt %) | 50.3 | 47.7 |
| Final [$SO_3$] (wt %) | 0.22 | 0.03 |
| Leachable [Cl] (ppm) | 305 | 105 |
| As-prepared SA ($m^2$/g) | 126 | 113 |
| 950° C./2 hrs ASA ($m^2$/g) | 87 | 87 |
| 1100° C./2 hrs ASA ($m^2$/g) | 41 | 43 |
| 1200° C./2 hrs ASA ($m^2$/g) | 9 | 16 |

Example 9

The following is an example demonstrating the method of preparing an oxide powder with an ultimate oxide composition of 4.9 wt % $CeO_2$, 6.2 wt % $Pr_6O_{11}$, 41.9 wt % $ZrO_2$, and 47.0 wt % $Al_2O_3$. The powder was prepared as described in EXAMPLE 8 with the following modifications: the aqueous solution of metal salts was prepared by mixing 27.5 lbs (12.5 kg) of aluminum nitrate nonahydrate crystals with 70.9 lbs (32.2 kg) of de-ionized water, adding to this mixture 1.4 lbs (0.64 kg) of cerium(III) nitrate stock aqueous solution (26.7 wt % on a $CeO_2$ basis), 1.1 lbs (0.50 kg) of praseodymium(III) nitrate stock aqueous solution (27.5 wt % on a $Pr_6O_{11}$ basis), and 15.3 lbs (6.9 kg) of zirconyl nitrate stock aqueous solution (20.1 wt % on a $ZrO_2$ basis); the dilute caustic solution was prepared using 70.9 lbs (32.2 kg) of de-ionized water; and 0.5 lbs (0.23 kg) of 35% hydrogen peroxide was used. The characterization results obtained from this material (PP225A) are summarized in Table 3, below, and are those from PP217I for comparison.

TABLE 3

Characteristics of composite materials obtained from EXAMPLE 7 (PP225A), EXAMPLE 8 (PP224G), and EXAMPLE 6 (PP217I, for comparison).

|  | PP217I | PP225A | PP224G |
|---|---|---|---|
| Material |  |  |  |
| [$CeO_2$] (wt %) | 5.5 | 4.9 | 4.6 |
| [$La_2O_3$] (wt %) | 0.0 | 0.0 | 8.2 |
| [$Pr_6O_{11}$] (wt %) | 0.0 | 6.2 | 0.0 |
| [$ZrO_2$] (wt %) | 46.8 | 41.9 | 41.1 |
| [$Al_2O_3$] (wt %) | 47.7 | 47.0 | 46.1 |

TABLE 3-continued

Characteristics of composite materials
obtained from EXAMPLE 7 (PP225A), EXAMPLE 8
(PP224G), and EXAMPLE 6 (PP217I, for comparison).

|  | PP217I | PP225A | PP224G |
|---|---|---|---|
| As-calcined textural properties (multi-point): | | | |
| SA (m²/g) | 120 | 123 | 96.1 |
| Total PV (cm³/g) | 0.690 | 0.515 | 0.344 |
| Mean PD (nm) | 21.1 | 16.0 | 16.0 |
| 950° C./2 h aged textural properties (multi-point): | | | |
| SA (m²/g) | 87.1 | 73.5 | 64.8 |
| Total PV (cm³/g) | 0.621 | 0.445 | 0.276 |
| Mean PD (nm) | 30.2 | 24.0 | 16.0 |
| 1100° C./2 h aged textural properties (multi-point): | | | |
| SA (m²/g) | 42.1 | 36.9 | 31.1 |
| Total PV (cm³/g) | 0.385 | 0.360 | 0.157 |
| Mean PD (nm) | 38.7 | 38.7 | 54.6 |

Example 10

The following is an example demonstrating the method of preparing an oxide powder with an ultimate oxide composition of 4.6 wt % $CeO_2$, 8.2 wt % $La_2O_3$, 41.1 wt % $ZrO_2$, and 46.1 wt % $Al_2O_3$. The powder was prepared as described in EXAMPLE 8 with the following modifications: the aqueous solution of metal salts was prepared by mixing 27.5 lbs (12.5 kg) of aluminum nitrate nonahydrate crystals with 71.1 lbs (32.3 kg) of de-ionized water, adding to this mixture 1.4 lbs (0.64 kg) of cerium(III) nitrate stock aqueous solution (26.7 wt % on a $CeO_2$ basis), 2.1 lbs (0.95 kg) of lanthanum nitrate stock aqueous solution (16.5 wt % on a $La_2O_3$ basis), and 15.0 lbs (6.8 kg) of zirconyl nitrate stock aqueous solution (20.1 wt % on a $ZrO_2$ basis); the dilute caustic solution was prepared using 71.1 lbs (32.3 kg) of de-ionized water; and 0.5 lbs (0.23 kg) of 35% hydrogen peroxide was used. The characterization results obtained from this material (PP224G) are summarized in Table 3, above.

$La_2O_3$ is thought to stabilise the textural properties of $Al_2O_3$ at elevated temperatures. Although this may be true in terms of mean pore diameter (PD), it certainly is not true with respect to surface area (SA) and total pore volume (PV) after aging at, for example, 1100° C./2 hrs. See Table 3, above. However, it is clear from the above discussions that the for the ALZ materials presented here prepared in the manner described here, $La_2O_3$ typically has a negative effect on the thermal stability of surface area and pore volume. $Pr_6O_{11}$ appears to have less of a detrimental influence on the aged surface area and pore volume than does $La_2O_3$ (see, for example, PP225A in Table 3 above).

Example 11

The following is an example demonstrating the method of preparing an oxide powder with an ultimate oxide composition of 18.4 wt % $CeO_2$, 40.4 wt % $ZrO_2$, and 41.2 wt % $Al_2O_3$. The powder was prepared as described in EXAMPLE 8 with the following modifications: the aqueous solution of metal salts was prepared by mixing 57.2 lbs (25.9 kg) of aluminum nitrate stock aqueous solution (8.2 wt % on an $Al_2O_3$ basis) with 91.4 lbs (41.5 kg) of de-ionized water, adding to this mixture 10.5 lbs (4.8 kg) of cerium(III) nitrate stock aqueous solution (22.6 wt % on a $CeO_2$ basis) and 33.9 lbs (15.4 kg) of zirconyl nitrate stock aqueous solution (20.1 wt % on a $ZrO_2$ basis); the dilute caustic solution was prepared using 150.0 lbs (68.0 kg) of de-ionized water; and 2.7 lbs (1.2 kg) of 35% hydrogen peroxide was used. The characterization results obtained from this material (PP244F) are summarized in Table 4, below.

TABLE 4

Characteristics of composite materials
obtained from EXAMPLE 11 (PP244F), EXAMPLE 12
(PP248A), and EXAMPLE 13 (PP351G).

| Material | PP244F | PP248A | PP351G |
|---|---|---|---|
| Oxide in pressure vessel (kgs) | 5-7 | 2.5 | 6.67 |
| Pre-ITP pH | 10.0 | 10.0 | 10.4 |
| [$CeO_2$] (wt %) | 18.4 | 16.2 | 14.3 |
| [$ZrO_2$] (wt %) | 40.4 | 38.6 | 38.0 |
| [$Al_2O_3$] (wt %) | 41.2 | 45.2 | 45.9 |
| 950° C./2 hrs ASA (m²/g) | 74 | 82 | 79 |
| 1100° C./2 hrs ASA (m²/g) | 30 | 44 | 44 |

The following is an example demonstrating the method of preparing an oxide powder with an ultimate oxide composition of 16.2 wt % $CeO_2$, 38.6 wt % $ZrO_2$, and 45.2 wt % $Al_2O_3$. The powder was prepared as described in EXAMPLE 8 with the following modifications: the aqueous solution of metal salts was prepared by mixing 99.8 lbs (45.3 kg) of aluminum nitrate nonahydrate with 266.7 lbs (121.0 kg) of de-ionized water, adding to this mixture 17.2 lbs (7.8 kg) of cerium(III) nitrate stock aqueous solution (22.8 wt % on a $CeO_2$ basis) and 55.7 lbs (25.3 kg) of zirconyl nitrate stock aqueous solution (20.1 wt % on a $ZrO_2$ basis); the dilute caustic solution was prepared using 266.7 lbs (121.0 kg) of de-ionized water; and 4.4 lbs (2.0 kg) of 35% hydrogen peroxide was used. Furthermore, the second washed wet cake was not all reslurried at pH 10.0 and hydrothermally treated in one batch like in EXAMPLE 8. Instead, the wet cake was divided into four equal parts and each part was then separately reslurried at pH 10.0 and hydrothermally treated in the same manner as in EXAMPLE 8. The characterization results obtained from this material (PP248A) are summarized in Table 4, above, and are compared with those obtained from PP244F. Note the improvement in the 1100° C./2 hrs ASA of PP248A compared to that of PP244F due to the decrease in the oxide content in the pressure vessel (which corresponds to an increase the ratio of $OH^-$ to oxide) in going from PP244F to PP248A.

Example 13

The following is an example demonstrating the method of preparing an oxide powder with an ultimate oxide composition of 14.3 wt % $CeO_2$, 38.0 wt % $ZrO_2$, and 45.9 wt % $Al_2O_3$ with sulfate concentration less than 0.05 percent by weight and leachable chloride levels less than 200 ppm on a dry oxide basis. An aqueous solution of metal salts was prepared by first dissolving and 37.0 lbs (16.8 kg) of zirconyl chloride (23.3 wt % on a $ZrO_2$ basis) stock aqueous solution and 15.0 lbs (6.8 kg) of cerium(III) nitrate stock aqueous solution (26.7 wt % on a $CeO_2$ basis) then 77.1 lbs (35.0 kg) of aluminum nitrate nonahydrate crystals into 70.8 lbs (32.1 kg) of de-ionized water in a 100 gallon (455 liter) intensive mixing tank equipped with an agitator rotating at high speed, mixing for 30 minutes, then reserving the solution in a separate vessel. The intensive mixing tank was then rinsed out with de-ionized water.

A dilute caustic solution was prepared by adding 52.0 lbs (23.6 kg) of de-ionized water to the intensive mixing tank and adjusting the pH to 10.0 using 25% caustic (sodium hydroxide solution). With the intensive mixing tank agitator rotating at high speed, to this dilute caustic solution the metal salt solution previously prepared was then transferred from its vessel in to the intensive mixing tank using a peristaltic pump. A separate stream of 25% caustic was simultaneously added from yet a separate vessel above the intensive mixing tank by opening a valve and allowing the caustic to flow into the intensive mixing tank due to gravity. Similar to EXAMPLE 1, using this procedure allowed for a constant precipitation pH of 10.0.

After all the metal salt solution had been transferred, the addition of caustic was stopped and the final pH of the resulting slurry adjusted to 10.5. Subsequently, 3.4 lbs of 35% hydrogen peroxide was added to the slurry, the pH was re-adjusted to 10.5 using caustic, and the slurry was allowed to mix for 30 minutes.

Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, 100 gallons of de-ionized water that has had its pH adjusted to 10.0 using caustic then heated to 60° C. was used to wash the wet cake. Subsequently, de-ionized water that had been heated to 60° C. was used to wash the wet cake until the ionic conductivity of the waste water exiting the centrifuge was <0.5 mS.

The resulting wet cake was then analytically checked to make sure the sulfate concentration was less than 0.05 percent by mass on a dried oxide basis and the chloride content was less than 200 ppm on a dried oxide basis before proceeding further.

Sixty (60.0) pounds (27.2 kg) of the first washed wet cake (24.5 percent oxide by mass) was re-slurried with 110.0 pounds (49.9 kg) of de-ionized water in the intensive mixing tank with an agitator rotating at high speed and the pH adjusted 10.44 using caustic (25% sodium hydroxide solution). The slurry was then pumped into a pilot-scale pressure vessel fitted with a stirrer and hydrothermally treated at 120° C. for 6 hrs. After the slurry temperature cooled sufficiently, it was discharged from the pressure vessel into the intensive mixing tank where the pH was adjusted to 8.0 using 30% nitric acid and the slurry allowed to mix for 30 minutes.

Live steam was then introduced so as to raise the temperature of the slurry to 60° C. (140° F.). The slurry was maintained at 60° C. while being mixed for one hour. Subsequently, the slurry was pumped to a continuous centrifuge where the liquid was separated from the precipitate to form a wet cake. When all of the slurry had been pumped through the centrifuge, de-ionized water heated to 60° C. was used to wash the wet cake until the ionic conductivity of the waste water exiting the centrifuge was <0.5 mS.

The resulting wet cake was then analytically checked to make sure the sodium concentration was less than 200 ppm by mass on a dried oxide basis before proceeding further.

The product was finished by calcining the cake (no drying at all) at 850° C. for 4 hours in the pilot plant kiln. After calcination, the chunks of material were pulverized into a coarse powder. Samples of this powder were then aged at 950° C./2 hrs or 1100° C./2 hrs. The characterization results obtained from this material (PP351G) are summarized in Table 4, above, and are compared with those obtained from PP244F and PP248A. Note the similarity in the 1100° C./2 hrs ASA of PP351G compared to that of PP248A even though the oxide content in the pressure vessel is greater in the case of PP351G. This was achieved by making sure the ratio of OH⁻ to oxide was the same as in PP248A, which requires an adjustment of the pH (see Table 4).

Example 14

The following is an example demonstrating the method of preparing an oxide powder with an ultimate oxide composition of 27.5 wt % $CeO_2$, 25.0 wt % $ZrO_2$, and 47.5 wt % $Al_2O_3$. The powder was prepared as described in EXAMPLE 13 with the following modifications: the aqueous solution of metal salts was prepared by dissolving 18.4 lbs (8.3 kg) of zirconyl chloride (23.2 wt % on a $ZrO_2$ basis) stock aqueous solution and 17.2 lbs (7.8 kg) of cerium(III) nitrate stock aqueous solution (20.1 wt % on a $CeO_2$ basis) then 54.3 lbs (24.6 kg) of aluminum nitrate nonahydrate crystals into 78.4 lbs (35.6 kg) of de-ionized water; the dilute caustic solution was prepared using 130.1 lbs (59.0 kg) of de-ionized water; and 4.0 lbs (1.8 kg) of 35% hydrogen peroxide was used. Furthermore 53.0 pounds (24.0 kg) of the first washed wet cake (24.5 percent oxide by mass) was re-slurried with 120.0 pounds (54.4 kg) of de-ionized water in the intensive mixing tank with an agitator rotating at high speed and the pH adjusted 10.00 using caustic (25% sodium hydroxide solution). The slurry was then pumped into a pilot-scale pressure vessel and from then on treated in the same manner as in EXAMPLE 13. The characterization results obtained from this material (PP329A) are summarized in Table 5, below.

TABLE 5

Characteristics of composite materials obtained from EXAMPLE 14 (PP329A), EXAMPLE 15 (PP329B), EXAMPLE 16 (PP402B), and EXAMPLE 17 (PP417B).

| | PP329A | PP329B | PP402B | PP417B |
|---|---|---|---|---|
| Material | | | | |
| LOI (wt %) | 3.1 | 3.2 | 2.0 | 3.2 |
| [CeO₂] (wt %) | 26.6 | 29.7 | 26.6 | 27.2 |
| [Pr₆O₁₁] (wt %) | — | 3.9 | 3.2 | 3.4 |
| [Al₂O₃] (wt %) | 46.0 | 44.1 | 42.7 | 43.2 |
| [SO₃] (wt %) | 0.01 | 0.01 | 0.01 | <0.01 |
| [Na] (ppm) | 94 | 96 | 69 | 116 |
| [Cl] (ppm) | 81 | 11 | 61 | 32 |
| As-prepared SA (m²/g) | 89 | 89 | 91 | 93 |
| 950° C./2 hrs ASA (m²/g) | 73 | 75 | 74 | 75 |
| 1000° C./4 hrs ASA (m²/g) | 61 | 60 | 64 | 63 |
| 1100° C./2 hrs ASA (m²/g) | 47 | 46 | 47 | 44 |
| As-calcined textural properties (multi-point): | | | | |
| SA (m²/g) | 92 | 94 | 95 | 91 |
| Total PV (cm³/g) | 24.0 | 19.6 | 24.0 | 21.1 |
| Mean PD (nm) | 0.505 | 0.505 | 0.518 | 0.630 |
| 950° C./2 h aged textural properties (multi-point): | | | | |
| SA (m²/g) | 76 | 79 | 80 | 73 |
| Total PV (cm³/g) | 0.492 | 0.489 | 0.523 | 0.457 |
| Mean PD (nm) | 21.6 | 21.6 | 27.1 | 24.8 |
| 1000° C./4 h aged textural properties (multi-point): | | | | |
| SA (m²/g) | 60 | 59 | 64 | 60 |
| Total PV (cm³/g) | 0.446 | 0.442 | 0.443 | 0.427 |
| Mean PD (nm) | 27.1 | 27.1 | 27.1 | 24.8 |

TABLE 5-continued

Characteristics of composite materials
obtained from EXAMPLE 14 (PP329A), EXAMPLE 15
(PP329B), EXAMPLE 16 (PP402B), and EXAMPLE 17
(PP417B).

|  | PP329A | PP329B | PP402B | PP417B |
|---|---|---|---|---|
| 1100° C./2 h aged textural properties (multi-point): | | | | |
| SA (m$^2$/g) | 46 | 48 | 44 | 45 |
| Total PV (cm$^3$/g) | 0.363 | 0.401 | 0.387 | 0.392 |
| Mean PD (nm) | 31.1 | 31.1 | 31.1 | 30.1 |

Example 15

The following is an example demonstrating the method of preparing an oxide powder with a target oxide composition of 26.3 wt % $CeO_2$, 3.3 wt % $Pr_6O_{11}$, 24.2 wt % $ZrO_2$, and 46.2 wt % $Al_2O_3$. The powder was prepared as described in EXAMPLE 13 with the following modifications: the aqueous solution of metal salts was prepared by dissolving 16.8 lbs (7.6 kg) of zirconyl chloride (23.2 wt % on a $ZrO_2$ basis) stock aqueous solution, 21.0 lbs (9.5 kg) of cerium(III) nitrate stock aqueous solution (20.1 wt % on a $CeO_2$ basis), and 844.0 g of praseodymium(III) nitrate stock aqueous solution (28.5 wt % on a $Pr_6O_{11}$ basis) then 54.6 lbs (24.8 kg) of aluminum nitrate nonahydrate crystals into 81.7 lbs (37.1 kg) of de-ionized water; the dilute caustic solution was prepared using 136.3 lbs (61.8 kg) of de-ionized water; and 5.4 lbs (2.4 kg) of 35% hydrogen peroxide was used. Furthermore 52.7 pounds (23.9 kg) of the first washed wet cake (23.3 percent oxide by mass) was re-slurried with 120.0 pounds (54.4 kg) of de-ionized water in the intensive mixing tank with an agitator rotating at high speed and the pH adjusted 10.00 using caustic (25% sodium hydroxide solution). The slurry was then pumped into a pilot-scale pressure vessel and from then on treated in the same manner as in EXAMPLE 13. The characterization results obtained from this material (PP329B) are summarized in Table 5, above.

Example 16

The following is an example demonstrating the method of preparing an oxide powder with a target oxide composition of 26.3 wt % $CeO_2$, 3.3 wt % $Pr_6O_{11}$, 24.2 wt % $ZrO_2$, and 46.2 wt % $Al_2O_3$. The powder was prepared as described in EXAMPLE 13 with the following modifications: the aqueous solution of metal salts was prepared by dissolving 16.9 lbs (7.7 kg) of zirconyl chloride (23.0 wt % on a $ZrO_2$ basis) stock aqueous solution, 21.0 lbs (9.5 kg) of cerium(III) nitrate stock aqueous solution (20.1 wt % on a $CeO_2$ basis), and 844.1 g of praseodymium(III) nitrate stock aqueous solution (28.5 wt % on a $Pr_6O_{11}$ basis) then 55.0 lbs (24.9 kg) of aluminum nitrate nonahydrate crystals into 48.0 lbs (21.8 kg) of de-ionized water; the dilute caustic solution was prepared using 52.0 lbs (23.6 kg) of de-ionized water; and 4.8 lbs (2.2 kg) of 35% hydrogen peroxide was used. Furthermore 60.0 pounds (27.2 kg) of the first washed wet cake (23.4 percent oxide by mass) was re-slurried with 120.0 pounds (54.4 kg) of de-ionized water in the intensive mixing tank with an agitator rotating at high speed and the pH adjusted 10.04 using caustic (25% sodium hydroxide solution). The slurry was then pumped into a pilot-scale pressure vessel and from then on treated in the same manner as in EXAMPLE 13. The characterization results obtained from this material (PP402B) are summarized in Table 5, above.

Example 17

The following is an example demonstrating the method of preparing an oxide powder with a target oxide composition of 26.3 wt % $CeO_2$, 3.3 wt % $Pr_6O_{11}$, 24.2 wt % $ZrO_2$, and 46.2 wt % $Al_2O_3$. The powder was prepared as described in EXAMPLE 13 with the following modifications: the aqueous solution of metal salts was prepared by dissolving 19.3 lbs (8.8 kg) of zirconyl chloride (20.2 wt % on a $ZrO_2$ basis) stock aqueous solution, 19.9 lbs (9.0 kg) of cerium(III) nitrate stock aqueous solution (21.2 wt % on a $CeO_2$ basis), and 844.1 g of praseodymium(III) nitrate stock aqueous solution (28.5 wt % on a $Pr_6O_{11}$ basis) then 55.0 lbs (24.9 kg) of aluminum nitrate nonahydrate crystals into 46.7 lbs (21.2 kg) of de-ionized water; the dilute caustic solution was prepared using 52.0 lbs (23.6 kg) of de-ionized water; and 4.8 lbs (2.2 kg) of 35% hydrogen peroxide was used. Furthermore 70.3 pounds (31.9 kg) of the first washed wet cake (21.0 percent oxide by mass) was re-slurried with 120.0 pounds (54.4 kg) of de-ionized water in the intensive mixing tank with an agitator rotating at high speed and the pH adjusted 10.03 using caustic (25% sodium hydroxide solution). The slurry was then pumped into a pilot-scale pressure vessel and from then on treated in the same manner as in EXAMPLE 13. The characterization results obtained from this material (PP417B) are summarized in Table 5, above.

Example 18

The following is an example demonstrating the method of preparing an oxide powder with a target oxide composition of 37.6 wt % $ZrO_2$ and 62.4 wt % $Al_2O_3$. The powder was prepared as described in EXAMPLE 13 with the following modifications: the aqueous solution of metal salts was prepared by dissolving 14.1 lbs (6.4 kg) of zirconyl chloride (20.2 wt % on a $ZrO_2$ basis) stock aqueous solution then 39.8 lbs (18.1 kg) of aluminum nitrate nonahydrate crystals into 50.5 lbs (22.9 kg) of de-ionized water; the dilute caustic solution was prepared using 52.0 lbs (23.6 kg) of de-ionized water; and no hydrogen peroxide was used. Furthermore 40.0 pounds (18.1 kg) of the first washed wet cake (31.1 percent oxide by mass) was re-slurried with 120.0 pounds (54.4 kg) of de-ionized water in the intensive mixing tank with an agitator rotating at high speed and the pH adjusted 10.04 using caustic (25% sodium hydroxide solution). The slurry was then pumped into a pilot-scale pressure vessel and from then on treated in the same manner as in EXAMPLE 13.

Example 19

The following is an example demonstrating the method of preparing an oxide powder with a target oxide composition of 19.0 wt % $La_2O_3$, 57.3 wt % $ZrO_2$ and 23.7 wt % $Al_2O_3$. The powder was prepared as described in EXAMPLE 8 with the following modifications: the aqueous solution of metal salts was prepared by dissolving 44.0 lbs (20.0 kg) of zirconyl nitrate (20.1 wt % on a $ZrO_2$ basis) stock aqueous solution and 17.7 lbs (8.0 kg) of lanthanum(III) nitrate stock aqueous solution (16.5 wt % on a $La_2O_3$ basis), then 26.9 lbs (12.2 kg) of aluminum nitrate nonahydrate crystals into 79.7 lbs (36.2 kg) of de-ionized water; the dilute caustic solution was prepared using 79.7 lbs (36.2 kg) of de-ionized water; and no hydrogen peroxide was used. No pressure treatment was used with this material and it was left in hydroxide form without calcination.

Example 20

The following is an example demonstrating the method of preparing an oxide powder with a target oxide composition of 70.7 wt % $ZrO_2$ and 29.3 wt % $Al_2O_3$. The powder was prepared as described in EXAMPLE 8 with the following modifications: the aqueous solution of metal salts was prepared by dissolving 77.5 lbs (35.2 kg) of zirconyl nitrate (20.1 wt % on a $ZrO_2$ basis) stock aqueous solution then 47.4 lbs (21.5 kg) of aluminum nitrate nonahydrate crystals into 103.4 lbs (46.9 kg) of de-ionized water; the dilute caustic solution was prepared using 103.4 lbs (46.9 kg) of de-ionized water; and no hydrogen peroxide was used. No pressure treatment was used with this material The product was finished by calcining the cake (no drying at all) at 700° C. for 4 hours in the pilot plant kiln. After calcination, the chunks of material were pulverized into a coarse powder. Samples of this powder were then aged at 950° C./2 hrs or 1100° C./2 hrs. The characterization results obtained from this material (PP351G) are summarized in Table 6, below,

TABLE 6

Characteristics of composite materials obtained from EXAMPLE 20 (PP223B).

| Material | PP223B |
|---|---|
| LOI (wt %) | 7.4 |
| [$ZrO_2$] (wt %) | 63.0 |
| [$Al_2O_3$] (wt %) | 29.6 |
| Final [$SO_3$] (wt %) | 0.02 |
| Leachable [Na] (ppm) | 176 |
| Leachable [Cl] (ppm) | 127 |
| As-prepared SA ($m^2/g$) | 189 |
| 950° C./2 hrs ASA ($m^2/g$) | 62 |
| 1100° C./2 hrs ASA ($m^2/g$) | 20 |
| 1200° C./2 hrs ASA ($m^2/g$) | 9 |

The invention claimed is:

1. A composite comprising, on an oxide basis, 42-70 wt % $Al_2O_3$, 10-48 wt % $ZrO_2$, 2-34 wt % $CeO_2$ and 0-9 wt % REOs other than $CeO_2$ and having the following properties after heating to 850° C. over four hours and holding at 850° C. for four hours then allowing to cool to ambient temperature:
   a surface area after aging at 950° C. for 2 hours equal to or greater than 60 $m^2/g$, and
   a surface area after aging at 1100° C. for 2 hours equal to or greater than 30 $m^2/g$,
   and having a sulfate ion content less than 0.05 percent by mass, a chloride ion content less than 200 ppm and a sodium ion content of less than 200 ppm, all on a dried oxide weight basis.

2. A composite as claimed in claim 1 comprising, on an oxide basis, 42-53 wt % $Al_2O_3$, 20-46 wt % $ZrO_2$, 4-34 wt % $CeO_2$ and 0-7 wt % REOs other than $CeO_2$ and $La_2O_3$ and having the following properties after heating to 850° C. over four hours and holding at 850° C. for four hours then allowing to cool to ambient temperature:
   a surface area after aging at 950° C. for 2 hours equal to or greater than 70 $m^2/g$, and
   a surface area after aging at 1100° C. for 2 hours equal to or greater than 35 $m^2/g$.

3. A composite comprising, on an oxide basis, 42-53 wt % $Al_2O_3$, 23-28 wt % $ZrO_2$, 24-29 wt % $CeO_2$ and 1-6 wt % $Pr_6O_{11}$ and having the following properties after heating to 850° C. over four hours and holding at 850° C. for four hours then allowing to cool to ambient temperature:
   a surface area after aging at 950° C. for 2 hours equal to or greater than 70 $m^2/g$,
   a surface area after aging at 1000° C. for 4 hours equal to or greater than 56 $m^2/g$, and
   a surface area after aging at 1100° C. for 2 hours equal to or greater than 41 $m^2/g$,
   and having a sulfate ion content less than 0.05 percent by mass, a chloride ion content less than 200 ppm and a sodium ion content of less than 200 ppm, all on a dried oxide weight basis.

4. A composite as claimed in-claim 1 comprising, on an oxide basis, 45-53 wt % $Al_2O_3$, 20-27 wt % $ZrO_2$, and 26-31 wt % $CeO_2$ and having the following properties after heating to 850° C. over four hours and holding at 850° C. for four hours then allowing to cool to ambient temperature:
   a surface area after aging at 950° C. for 2 hours equal to or greater than 70 $m^2/g$,
   a surface area after aging at 1000° C. for 4 hours equal to or greater than 57 $m^2/g$, and
   a surface area after aging at 1100° C. for 2 hours equal to or greater than 43 $m^2/g$.

5. A composite as claimed in-claim 1, comprising, on an oxide basis, 44-50 wt % $Al_2O_3$, 35-43 wt % $ZrO_2$, and 12-16 wt % $CeO_2$ and having the following properties after heating to 850° C. over four hours and holding at 850° C. for four hours then allowing to cool to ambient temperature:
   a surface area after aging at 950° C. for 2 hours equal to or greater than 75 $m^2/g$, and
   a surface area after aging at 1100° C. for 2 hours equal to or greater than 41 $m^2/g$.

6. A composite as claimed in claim 1 comprising, on an oxide basis, 60-70 wt % $Al_2O_3$, 10-15 wt % $ZrO_2$, 10-15 wt % $CeO_2$ and 1-7 wt % REOs other than $CeO_2$ and having the following properties after heating to 850° C. over four hours and holding at 850° C. for four hours then allowing to cool to ambient temperature:
   a surface area after aging at 950° C. for 2 hours equal to or greater than 75 $m^2/g$,
   a surface area after aging at 1000° C. for 4 hours equal to or greater than 70 $m^2/g$,
   a surface area after aging at 1050° C. for 2 hours equal to or greater than 65 $m^2/g$, and
   a surface area after aging at 1100° C. for 2 hours equal to or greater than 55 $m^2/g$.

7. A composite comprising, on an oxide basis, 42-70 wt % $Al_2O_3$, 10-48 wt % $ZrO_2$, 2-34 wt % $CeO_2$ and 1-9 wt % rare earth oxides (REOs) other than $CeO_2$, where REOs correspond to
   one or more of $Nd_2O_3$, $Pr_6O_{11}$, $Sm_2O_3$, or other rare earth oxide, other than $La_2O_3$ or $Y_2O_3$,
   and having the following properties after heating to 850° C. over four hours and holding at 850° C. for four hours then allowing to cool to ambient temperature:
   a surface area after aging at 950° C. for 2 hours equal to or greater than 60 $m^2/g$, and
   a surface area after aging at 1100° C. for 2 hours equal to or greater than 30 $m^2/g$,
   and having a sulfate ion content less than 0.05 percent by mass, a chloride ion content less than 200 ppm and a sodium ion content of less than 200 ppm, all on a dried oxide weight basis.

* * * * *

UNITED STATES PATENT AND TRADEMARK OFFICE
CERTIFICATE OF CORRECTION

| | | |
|---|---|---|
| PATENT NO. | : 7,939,041 B2 | Page 1 of 1 |
| APPLICATION NO. | : 11/813049 | |
| DATED | : May 10, 2011 | |
| INVENTOR(S) | : John G. Darab | |

It is certified that error appears in the above-identified patent and that said Letters Patent is hereby corrected as shown below:

In column 2, line 67, under DETAILED DESCRIPTION OF THE INVENTION, please delete "$La_2C_3$" and insert therefor --$La_2O_3$--.

Signed and Sealed this
Twenty-second Day of November, 2011

David J. Kappos
*Director of the United States Patent and Trademark Office*